United States Patent
Takashima et al.

(10) Patent No.: US 6,234,659 B1
(45) Date of Patent: May 22, 2001

(54) SURGE SUPPRESSOR FOR VENTED INJECTION MOLDING MACHINE SCREW

(75) Inventors: Stephen T. Takashima, Mansfield; John C. Medici, Jr., Fredericktown, both of OH (US)

(73) Assignee: HPM Corporation, Mount Gilead, OH (US)

(*) Notice: Subject to any disclaimer, the term of this patent is extended or adjusted under 35 U.S.C. 154(b) by 0 days.

(21) Appl. No.: 09/160,926

(22) Filed: Sep. 25, 1998

(51) Int. Cl.[7] .................................................. B01F 7/08
(52) U.S. Cl. ................... 366/79; 366/82; 366/88; 366/89
(58) Field of Search .................... 366/79, 82, 88, 366/89, 99, 318, 319, 323; 425/203, 587

(56) References Cited

U.S. PATENT DOCUMENTS

| | | | |
|---|---|---|---|
| 2,753,595 | 7/1956 | Dulmage | 18/12 |
| 3,271,819 | 9/1966 | Lacher | 18/12 |
| 3,367,635 | 2/1968 | Gresch | 259/4 |
| 3,599,292 | 8/1971 | Ronzoni | 18/30 |
| 3,671,021 | 6/1972 | Pomper et al. | 259/109 |
| 3,701,512 | 10/1972 | Schippers et al. | 259/191 |
| 3,737,151 | 6/1973 | Schaeffer et al. | 259/191 |
| 3,858,856 | 1/1975 | Hsu | 259/191 |
| 3,867,079 | 2/1975 | Kim | 425/208 |
| 3,870,284 | 3/1975 | Kruder | 259/191 |
| 4,000,884 | 1/1977 | Chung | 259/191 |
| 4,060,226 | 11/1977 | Schweller | 366/75 |
| 4,074,362 | 2/1978 | Kruder et al. | 366/82 |
| 4,107,788 | 8/1978 | Anders | 366/81 |
| 4,112,519 | 9/1978 | Kruder | 366/266 |
| 4,128,341 | 12/1978 | Hsu | 366/89 |
| 4,143,974 | 3/1979 | Strassheimer et al. | 366/78 |
| 4,154,536 | 5/1979 | Sokolow | 366/90 |
| 4,173,417 | 11/1979 | Kruder | 366/89 |
| 4,185,060 | 1/1980 | Landley, Jr. | 264/54 |
| 4,201,481 | 5/1980 | Iddon et al. | 366/79 |
| 4,215,978 | 8/1980 | Takayama et al. | 425/190 |
| 4,227,870 | 10/1980 | Kim | 425/208 |
| 4,277,182 | 7/1981 | Kruder | 366/89 |
| 4,314,765 | 2/1982 | Hotz | 366/75 |
| 4,330,214 | 5/1982 | Willert | 366/78 |
| 4,573,799 | 3/1986 | Anders | 366/89 |
| 4,652,138 | * 3/1987 | Inoue et al. | 366/89 |
| 4,729,662 | 3/1988 | O'Brien | 366/89 |
| 4,733,970 | 3/1988 | Yokama | 366/79 |
| 4,840,492 | 6/1989 | Nakamura | 366/81 |
| 4,896,969 | 1/1990 | Dray | 366/88 |
| 4,925,313 | 5/1990 | Nunn | 366/81 |
| 4,940,329 | * 7/1990 | Dienst | 366/75 |
| 4,944,906 | 7/1990 | Colby et al. | 264/101 |
| 4,946,356 | 8/1990 | Kumazaki | 425/135 |

(List continued on next page.)

FOREIGN PATENT DOCUMENTS

| | | |
|---|---|---|
| 61-222706 | 10/1986 | (JP). |
| 62-42820 | 2/1987 | (JP). |
| 63-104811 | 5/1988 | (JP). |

OTHER PUBLICATIONS

Spirex—Screw and Barrel Technology, pp. 21–22, 1985.

*Primary Examiner*—W. L. Walker
*Assistant Examiner*—Michael A. Fleming
(74) *Attorney, Agent, or Firm*—Baker & Daniels

(57) ABSTRACT

A plasticating apparatus adapted to handle a wide variety of synthetic resinous materials without predrying. The plasticating apparatus includes a two-stage screw rotatably and reciprocably mounted within a barrel. A surge suppressor is provided between the first and second stages and is comprised of an integral protrusion of the screw root and a deep channel section immediately preceding the protrusion. The surge suppressor prevents the surge of molten material into the vent area following the holding portion of an injection molding cycle, thereby allowing faster recovery and preventing bleeding of plasticized material from the vent opening.

13 Claims, 2 Drawing Sheets

U.S. PATENT DOCUMENTS

| | | | |
|---|---|---|---|
| 5,033,860 | 7/1991 | Nakamura | 366/89 |
| 5,035,509 | 7/1991 | Kruder | 366/89 |
| 5,071,256 | 12/1991 | Smith et al. | 366/89 |
| 5,088,914 | 2/1992 | Brambilla | 425/208 |
| 5,288,223 | 2/1994 | Toro | 425/208 |
| 5,486,328 | 1/1996 | Luker | 264/211.23 |
| 5,534,204 | 7/1996 | Aoki et al. | 264/102 |
| 5,551,777 | 9/1996 | Tjahjadi et al. | 366/100 |
| 5,597,525 | 1/1997 | Koda et al. | 264/537 |
| 5,599,097 | 2/1997 | Christie | 366/88 |
| 5,599,098 | 2/1997 | Christie | 366/90 |
| 5,630,968 | 5/1997 | Wang et al. | 264/53 |

* cited by examiner

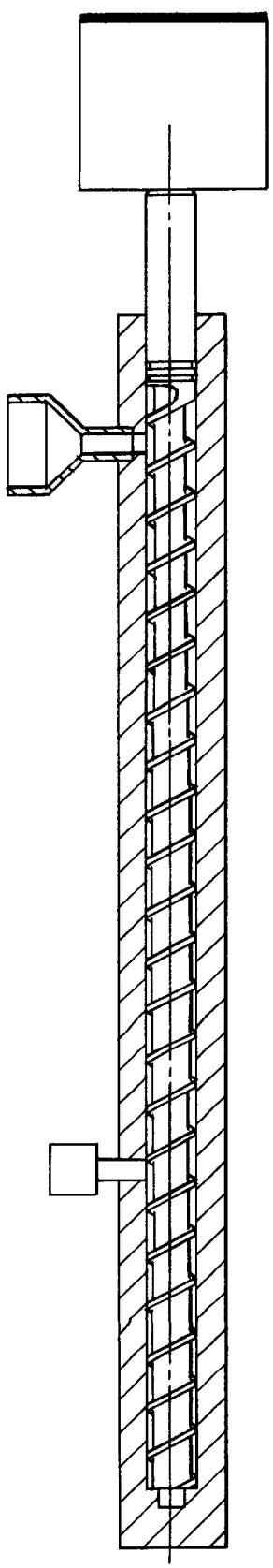
FIG_1
PRIOR ART
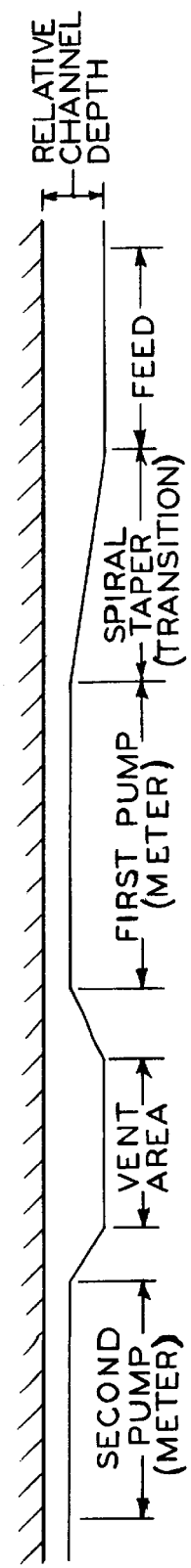
FIG_2
PRIOR ART

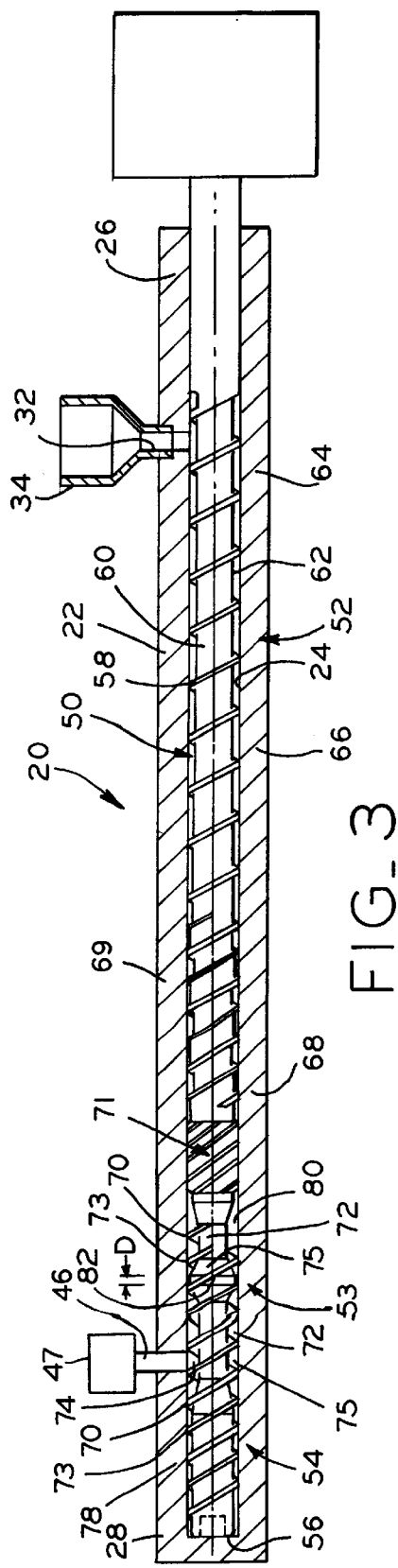
FIG_3
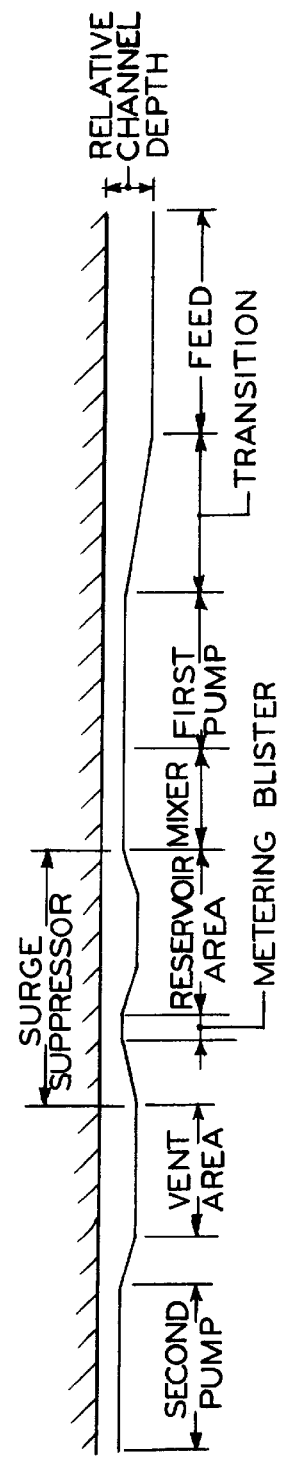
FIG_4

SURGE SUPPRESSOR FOR VENTED INJECTION MOLDING MACHINE SCREW

BACKGROUND OF THE INVENTION

This invention relates generally to injection molding machines. More particularly, this invention concerns vented injection molding machines having a two-stage screw therein or extruder screws wherein the first stage surges.

An injection molding machine typically receives synthetic resinous material as a particulate feedstock, heats, masticates and plasticates the material to a moldable consistency, and then forces the plasticated material into a mold. In the past, readily volatilized substances or moisture present in a particulate synthetic resinous material feedstock for an injection molding machine frequently led to defects in the molded product produced by the machine. Many defects are attributed to the evolution of gaseous pockets containing water vapor or volatilized substances. For example, defects such as polymer degradation and diminished physical material properties in a molded product have been attributed to such gaseous pockets. Moreover, the gaseous pockets cause surface defects in the molded product, such as loss of gloss and voids. These latter defects are sometimes merely cosmetic but do, on occasion, substantially affect physical properties of the molded product. Moisture and volatilizable substances must therefore be eliminated from synthetic resinous material during the molding thereof.

One solution for avoiding moisture in feedstock requires a separate drying apparatus to predry hygroscopic synthetic resinous material and to remove the moisture therefrom before supplying the material to an injection molding machine. However, a separate drying apparatus involves an additional capital expense which reduces the profitability of the injection molding apparatus.

To accommodate a feedstock having readily volatilized substances therein, an injection molding machine should be provided with a vent to allow gaseous volatiles to escape after the feedstock has been plasticated and masticated to a molding consistency. The known prior art vented molding machines, however, are subject to bleed of plasticized material into the vent opening with the concomitant problem of possible blockage of the vent opening.

When dealing with feedstock having fine particle size, such as a powdered feedstock, a vent opening is also necessary in a molding machine to eliminate air occlusions which may occur from air pockets fed along with the feed material into the plasticating screw of the molding machine.

Examples of particular synthetic resinous materials for which venting is desirable during injection molding are as follows: polyesters, polycarbonates, nylons, acrylics, ABS, styrenic polymers, acetal polymers, polyphenylene oxides, and barrier resins (such as "Barex", and "Lopac").

In fashioning articles of indeterminate length from synthetic resinous materials, vented extruders allow removal of volatiles as well as moisture from feedstock. Unlike injection molding machines, however, extruders operate with essentially steady material flow into the machine, essentially steady or continuous flow of product material out of the machine, and essentially steady flow of material through a vent section of the extruder machine. Because vented extruders operate at steady state, only small fluctuations in flow conditions inside the barrel at a vent opening typically occur.

A typical injection molding machine, by contrast, operates in a three-part cycle, a plasticating portion during which feedstock is prepared to a molding consistency, an injection portion during which the plasticated material is injected into a mold cavity, and a holding portion during which material in the mold is permitted to solidify. The cyclical operation of the molding machine causes unsteady flow conditions to prevail inside the molding machine, which in turn contribute to the problem described above wherein plasticized material bleeds into the vent opening.

As a result of their cyclical operation, vented screws for injection molding have to accommodate a large surge of plastic through the vent section without pushing plasticized material out of the vent. The surge occurs because, unlike the continuous extrusion process, in injection molding, the screw stops rotating during the holding portion. During this time, plastic continues to melt in the hot barrel, particularly in the first pumping section as shown in the prior art machine in FIGS. 1 and 2. When the screw resumes rotating, the pool of melted material is quickly and easily conveyed along the screw, thereby forming a surge which causes the above noted vent bleed problem.

Moreover, during the injection portion of a molding cycle, a plasticating screw is typically impulsively stroked forward through a distance of several inches to inject a charge of plasticated material into a mold cavity. During this injection portion, pressures in the plasticated material on the order of 20,000 psi have been known to exist and to aggravate the vent bleed problem.

Particularly undesirably, the plasticated material may solidify in the vent opening and thereby block the vent opening. Thereafter, the subsequent release of volatilized material from the vent opening is severely inhibited, if not actually prevented.

Various injection molding machines have been proposed in the prior art to overcome problems of the type described above. However, each of the prior art machines is objectionable by virtue of having one or more of the following disadvantages: narrow range critical operation; low plasticating capacity; and extensive modifications of a conventional mechanical or hydraulic operating system.

One particular example is the injection molding machine disclosed in U.S. Pat. No. 4,074,362, which is assigned to the assignee of the present invention and is hereby incorporated herein by reference. U.S. Pat. No. 4,074,362 discloses a metering blister 84 disposed between the first and second stages of the screw. In such a design, at the onset of the plastication portion of the molding cycle, metering blister 84 "meters" the flow of plasticated material exiting the first stage. However the blister disclosed by U.S. Pat. No. 4,074,362 only restricts flow. It does not suppress surges of material but merely limits the maximum flow thereacross. Indeed, a design such as that shown in U.S. Pat. No. 4,074,362 may actually aggravate a surge problem. That is, excess plasticated material builds up along the first stage of the screw during the surge because the metering blister prevents the flow of such material thereover. Adjustments must be made for this excess material, such as slowing the screw rpm, which in turn leads to the above described problem of lowering the plasticating capacity.

Thus, a need continues to exist for an effective injection molding machine having a vent that permits volatile materials and water vapor to be released from a plasticized material during an injection molding machine cycle without material bleeding into and clogging the vent. In particular, a need continues to exist for an effective way of addressing the surge induced vent bleed problem without reducing the plasticating capacity of the machine.

SUMMARY OF THE INVENTION

The present invention overcomes the above noted vent bleed problems by providing a surge suppressor disposed intermediate of the first and second stages in a vented injection molding machine. Specifically, the surge suppressor of the present invention includes a reservoir area of deep channel depth and an integral protrusion of the screw root disposed immediately downstream thereof.

The present invention provides a solution to the above noted vent bleed problem without reducing the plasticating capacity of the injection molding apparatus. In an injection molding apparatus of the present invention, during surges, the present invention restricts flow of material into the vent area, thereby preventing material from clogging the vent opening. The material which is restricted accumulates in a reservoir area during the surge, and then empties from the reservoir area as the injection molding apparatus approaches a substantially steady state operation. In this manner, the surge suppressor of the present invention compensates for the cyclic nature inherent in injection molding machines without adversely affecting plasticating capacity or requiring extensive modifications of a conventional mechanical or hydraulic operating system.

In one form, the present invention is a vented injection molding apparatus operable to masticate, plasticate and devolitize synthetic resinous materials while preparing the synthetic resinous material for injection into a mold cavity which shapes the material. The apparatus comprises a barrel having a longitudinal screw receiving bore, a distal end, a feed opening communicating with the bore to admit synthetic resinous feed material, a discharge opening communicating with the bore at the distal end to deliver material to a mold, and a vent opening disposed intermediate the feed opening and the discharge opening to exhaust liberated gases. A screw having a root and a protruding helical flight is positioned in the screw receiving bore and includes a first stage communicating with the feed opening and operable within the barrel to receive, masticate and substantially and completely plasticate the synthetic resinous material and a second stage communicating with the vent opening and the discharge opening. The surge suppressor is disposed intermediate the first and second stages, and is operable to suppress surges of plasticated material occurring during an injection molding cycle, accumulate plasticated material during the surges, and dispense the accumulated plasticated material downstream between surges. The surge suppressor further includes a reservoir area of increased channel depth and an integral protrusion of the root of the screw. The protrusion is disposed downstream and adjacent to the reservoir area.

In a preferred form of the invention, a second helical thread of increased pitch originates in the surge suppressor and extends across the protrusion. Furthermore, the protrusion has a peripheral surface which provides a working radial clearance with the bore of the screw. This working clearance is adapted so that plasticated material flows downstream unrestricted past the protrusion when plastication in the apparatus has reached a substantially steady state condition, whereas the working clearance is also adapted to restrict surges of plasticated material. The reservoir accumulates the plasticated material restricted during the surges and then dispenses the plasticated material downstream during the substantially steady state condition.

In another preferred form of the above described invention, a "twin flight" helical thread originates in the surge suppressor and extends to a distal end of the screw. The twin flight provides increased drag flow and thereby enhances the rate at which the surge suppressor is emptied during periods after a surge has occurred.

Advantageously, the surge suppressor of the present invention compensates for the cyclical operation of a vented injection molding machine which causes unsteady flow conditions to prevail therein. Specifically, during the holding portion of the cycle in which material in the mold is permitted to solidify, the screw does not rotate. Solid plastic material in the barrel, particularly in the first pumping section, nonetheless continues to melt and a pool of melt material therefore forms during the holding portion. When the screw resumes rotating at the onset of the next plastication portion, the melted material, because of its lower viscosity relative to partially melted or solid material, provides less resistance to being conveyed along the screw. As a consequence, a surge of material flow results when the screw resumes rotating. Advantageously, the resulting surge is prevented from bleeding into the vent opening and clogging it by the novel surge suppressor feature of the present invention. Specifically, the protrusion of the surge suppressor allows a flow throughput greater than the quasi-steady state condition achieved during the plastication portion of the molding cycle, but at the same time, restricts the "surge" of material that occurs at the onset of the plastication portion. During the surge, then, material accumulates in the reservoir area of deep channel depth. The surge gradually diminishes as the plastication portion continues and approaches steady state and the accumulated melt material in the reservoir area empties.

Several factors come into play which allow the reservoir of the surge suppressor to accumulate material during the surge yet empty the reservoir during periods of substantially steady state operation. First, the working clearance provided between the outer circumferential surface of the protrusion and the cylindrical bore is adapted so that surges of material are restricted. At the same time, the working clearance is also adapted to be large enough to allow a flow of material thereacross greater than the steady state output of the first stage. Thus, the protrusion does not impede flow once the surge is over. Finally, the twin flight helical threads of increased pitch, which extend continuously throughout the surge suppressor, cause the surge suppressor to convey material more quickly than the output of the first stage, in turn causing the reservoir to empty.

The advantage of the present invention is that it avoids the pesky problem of molten material bleeding into the vent opening and clogging it. Yet, at the same time, the surge suppressor of the present invention does not impede flow of plasticated material during the quasi-steady state condition achieved during the plastication cycle of an injection molding machine. As a result, the above-noted drawbacks involving reduced plastication capacity are avoided with the present invention.

BRIEF DESCRIPTION OF THE DRAWINGS

The above-mentioned and other features and advantages of this invention, and the manner of attaining them, will become more apparent and the invention itself will be better understood by reference to the following description of an embodiment of the invention taken in conjunction with the accompanying drawings, wherein:

FIG. 1 is a view in partial cross section of a prior art vented injection molding machine;

FIG. 2 is a diagrammatic view which illustrates the variation in channel depth along the screw of FIG. 1;

FIG. 3 is a view in partial cross section of a vented injection molding machine screw in accordance with a first embodiment of the present invention;

FIG. 4 is a diagrammatic illustrating the relative channel depth of the screw of FIG. 3.

Corresponding reference characters indicate corresponding parts throughout the several views. The exemplification set out herein illustrates one preferred embodiment of the invention, in one form, and such exemplification is not to be construed as limiting the scope of the invention in any manner.

DETAILED DESCRIPTION OF THE INVENTION

A vented injection molding machine constructed according to the description herein is suitable for use with a wide variety of synthetic resinous materials such as polyesters, polycarbonates, acrylics, nylons, styrenic polymers, barrier resins, acetal polymers, polyphenylene oxides, and ABS. The synthetic resinous material fed to the injection molding machine will typically be in a particulate form. The particle size may be very small such that the material resembles a powder. While the present invention is described in terms of a vented injection molding machine, it is to be understood that the present invention can also be used with extruder screws, particularly those where the first stage surges.

The present invention relates to a vented injection molding machine which has many features well-known in the art of injection molding machines. FIGS. 1 and 2 show a prior art injection molding machine lacking the surge suppressor feature of the present invention, and are included so that the novel features of the surge suppressor of the present invention are clearly understood. The description below of an exemplary embodiment first discusses the first and second stages of the injection molding machine in accordance with the present invention, the features of which are similar to those disclosed in U.S. Pat. No. 4,074,362, assigned to the assignee of the present invention and incorporated herein by reference. The novel features of the surge supressor of the present invention are then disclosed.

Turning now to FIG. 3, a vented injection molding machine 20 includes an elongated barrel 22 provided with a centrally disposed longitudinal bore 24 having a generally circular cross section. The bore 24 extends from a first end 26 of the barrel 22 to a second end 28 of the barrel and is adapted to receive a plasticating screw. At the first end 26 of the barrel, a generally radial feed opening 32 extends substantially vertically through the barrel 22 to provide communication with the bore 24. Mounted on top of the barrel 22 in general alignment with the feed opening 32 is a feed hopper 34. The hopper 34 holds synthetic resinous material in particulate form, i.e., a feed stock, such that the material may enter the bore 24 through the feed opening 32.

The second or distal end 28 of the barrel 22 discharges into a mold cavity (not shown) to allow injection of plasticated material into the mold cavity. Also communicating with the bore 24 of the barrel 22 (see FIG. 3), is a vent opening 46 having vent stack 47. The vent opening 46 is positioned between the feed opening 32 and the distal end 28 of the barrel 22 as indicated in FIG. 3. Ordinarily, the vent opening 46 is located less than 50% of the distance from the distal end 28 to the feed opening and closer to the distal end 28. Positioned within the bore 24 is an elongated plasticating screw 50 having two stages and a length to diameter ratio of about 34 to 1. Screw 50 is rotatably and reciprocably mounted in the barrel bore 24. A first stage 52 of the screw 50 communicates with the feed opening 32 and extends to a location between the vent opening 46 and the feed opening 32 such that the downstream end of the first stage 52 remains upstream of the vent opening 46 for all longitudinal positions of the screw 50 relative to the barrel. The first stage 52 in cooperation with the barrel 22 is operable to heat, masticate, and completely plasticate the particulate material feed stock to a substantially moldable consistency. In so doing, any moisture and volatizable material becomes gaseous.

Downstream of first stage 52 is the surge suppressor 53 of the present invention, which is described hereinbelow. Downstream of surge suppressor 53 is a second stage 54 which extends to a distal end 56 of the screw and is operable to receive plasticated material from surge suppressor 53. Gaseous material vents through the vent opening 46 while plasticated material is conveyed to the screw end 56 for accumulation.

More particularly, the first stage 52 includes a radially outwardly extending helical screw flight 58 which cooperates with the screw root 60 and the bore 24 to define a helical channel 62 of variable depth. Channel depth is measured radially from the screw root 60 to the barrel bore 24. The helical channel 62 extends through the first stage and has a first uniform depth feed section 64 communicating with the feed opening 32 and is operable to receive particulate synthetic resinous material from the feed opening 32 during rotation of the screw 50. The relative depth of feed section 64 is illustrated in FIG. 4.

Downstream of feed section 64, channel 62 includes a transition section 66 in which helical channel 62 has a decreasing depth such that the diameter of screw root 60 increases. In the transition section 66, mastication, heating and pressurization occur. Downstream of transition section 66, the channel includes a first pumping section 68 having double wave section 69 and a streamlined Egan mixer 71. The double wave design is well-known and is disclosed in U.S. Pat. No. 4,173,417 which is assigned to the assignee of the present invention, and is hereby incorporated by reference. Egan mixers are also well-known in the art and a common type of such design is illustrated and explained in U.S. Pat. No. 2,753,595. Egan mixer 71 is optional and could be replaced with another mixing device or omitted entirely. The pumping section 68 extends to the downstream end of the first stage 52 and is operable to complete plastication of the synthetic resinous material to a substantially moldable consistency as well as to effect vaporization of moisture and volatile substances present in the feed stock.

The second stage 54 includes generally radially extending twin helical screw flights 70 and 73 which cooperate with shank 60 of screw 50 and bore 24 to define helical channels 72 and 75 through which plasticated material is conveyed as the screw rotates. Flights 70 and 73 each have a pitch which exceeds the pitch of helical thread 58 in the first stage. Helical channels 72 and 75 have variable depth and extend from the downstream end of surge suppressor 53 to the distal end 56 of the screw. The upstream ends of helical channels 72 and 75 include a vent portion 74 in which the channel depth is substantially greater than the depth of the first helical channel 62 in pumping section 68 as shown in FIG. 4. Vent portion 74 communicates with vent opening 46 for all longitudinal positions of screw 50 in barrel 22 so that vaporized moisture and volatile material can escape. Moreover, the comparative greater depth of vent section 74 allows depresserization of the plasticated material to facilitate release of pockets of vaporized material. Downstream of the vent section 74, the plasticated material will completely fill the second helical channels 72 and 75 and create a hydraulic seal for the vent section. The depth of the second helical channels 72 and 75 decrease rapidly into a relatively short second pumping stage 78 in which the helical channels 72 and 75 have a comparatively small depth, much smaller than the vent section and the feed section. The pitch of flights 73 and 70 decreases in pumping stage 78 to improve the capability of the screw to pump against pressure. The pitch of the screw thread from the feed section to the end of the first pumping section is roughly 4.5 inches, the pitch of each of the twin threads 70 and 73 starts as 9.4 inches and decreases in pumping stage 78 to roughly 6.4 inches. It is to be understood that the pitch of the screw thread throughout the screw of the present invention can be varied significantly within the scope and spirit of the present invention.

With reference to FIGS. 3 and 4, the surge suppressor feature of the present invention is now described. After Egan mixer 71, the depth of the helical channel increases rapidly into reservoir area 80 which comprises an area of deep channel depth. As shown in FIG. 4, reservoir area 80 has a depth approximately the same as vent area 74. This depth can be adjusted for the size of the expected surge. Continuing downstream from reservoir area 80, the channel depth decreases rapidly into an integral protrusion 82 of the screw root. In the illustrated embodiment, protrusion 82 comprises a radially outwardly extending annular ring which is radially spaced from bore 24 to define a restricted annular space through which plasticated material may flow. That is, the protrusion 82 has a peripheral surface providing a working radial clearance with bore 24 of cylindrical barrel 22. Generally, protrusion 82 is an area of shallow channel depth disposed intermediate reservoir area 80 and vent area 74, defining a restricted annular space. While shown as cylindrical in FIG. 3, protrusion 82 could be of another shape, such as round, for example. Helical screw flights 70 and 73 continue along protrusion 82 without interruption, the benefits of which are explained hereinbelow. The width, D, of protrusion 82 is 15% of the pitch of screw thread 70 in the illustrated embodiment, but it is to be understood that the width of protrusion 82 can be between 10% to 100% of the pitch of the screw thread. The rise of the protrusion from the reservoir depth should be quick, e.g., the rise should occur within a distance equaling the diameter of the screw. A quick rise of the screw root to protrusion 82 minimizes the increase in flow that occurs as the reservoir fills up. The pressure flow in the reverse direction increases exponentially with a deeper channel.

As shown in FIG. 3, screw flight 58 ends at the start of Egan mixer 71. Twin flights 70 and 73 begin in reservoir area 80 as shown in FIG. 3. Twin flights 70 and 73 have a pitch which is greater than the pitch of flight 58. Thus, flights 70 and 73 convey material along screw 20 faster than does flight 58. This increase in pitch produces increased "drag flow" through reservoir area 80 and thereby causes reservoir area 80 to empty during the plastication portion of the cycle. Twin flights 70 and 73 could, optionally, be replaced with a single flight having a greater pitch than flight 58.

The advantages of the surge suppressor 53 can be better understood with reference to the operation of an injection molding screw using a surge suppressor of the present invention. A typical injection molding machine employing the present invention operates in a cycle consisting of a plasticating portion during which feed stock is prepared to a molding consistency, an injection portion during which the plasticated material is injected into a mold cavity, and a holding portion during which material in the mold is permitted to solidify.

During the plasticating portion, the material passes from hopper 34 (FIG. 3) through the feed opening 32 into first helical channel 62 and feed section 64 of first screw stage 52. As screw 50 rotates, the particulate material is advanced along feed section 64 and enters transition section 66. While passing through transition section 66 and downstream into pumping section 68, the particulate synthetic resinous material is compressed, heated, masticated and plasticated to a substantially moldable consistency, aided by double wave section 69 and Egan mixer 71. At the same time, moisture and volatizable substances are vaporized and form gaseous pockets in the plasticated material.

The plasticated synthetic resinous material advances to the downstream end of first stage 52 and into reservoir area 80. During the plasticating portion, the plasticated material is conveyed through reservoir area 80 by flights 70 and 73 to protrusion 82. The clearance between protrusion 82 and bore 24 is designed so that the output of plasticated material during the plasticating portion, once the plasticating portion reaches a substantially steady state, or quasi steady state, is not restricted by protrusion 82. Indeed, the surge suppressor is adapted to produce a throughput greater than the steady state output during the plastication portion. Such is done by providing twin flights 70 and 73 of increased pitch and controlling the clearance over protrusion 82.

After passing through the surge suppressor, the plasticated material during the plastication cycle is conveyed through vent area 74 where pressurized gaseous pockets of water vapor and volatile substances are released and escape through vent opening 46, either to the atmosphere or to a subsequent processing apparatus. The plasticated material then passes into the second pumping stage 78 which advances the material to the mold chamber (not shown). The material accumulates in the mold chamber awaiting injection into a mold cavity (not shown).

The next portion of the cycle is the injection portion during which the plasticated material accumulated in the mold chamber (not shown) is injected into the mold cavity (not shown). Finally, a holding portion occurs during which time material in the mold is permitted to solidify.

During the period of time in which the plasticated material is injected in the mold cavity, or the "holding portion," screw 50 is not rotating. The holding portion comprises the time in which the gates freeze, the clamp opens, the plastic part is extracted, and the clamp again closes. During this time, plastic continues to melt in the hot barrel 22 and forms a pool of melt material. The melted material in the first stage of the screw develops a low viscosity and therefore becomes easily conveyed along the screw once the screw resumes rotating. The quickly conveyed melted plastic presents a problem in prior art injection molding machines. When the screw resumes rotating, this pool of melted material, which is quickly and easily conveyed along the screw, thereby forms a "surge." The "surge" can be likened to a wave of material being conveyed along the screw.

This "surge" of material along the screw can, in prior art injection molding machines, clog the vent opening because a large quantity of material is conveyed in a short period of time. However, with the present invention, during the surge, protrusion 82 restricts the flow of material thereover, which in turn causes the melted material to fill reservoir area 80. The clearance between protrusion 82 and bore 24 is designed such that the maximum amount of material which can be conveyed through protrusion 82 during the above-described surge cannot clog vent opening 46. At the same time, the clearance between protrusion 82 and bore 24 is also designed to accommodate an output greater than the steady state output during the plastication cycle. In fact, surge suppressor 53 actually produces an output greater than the steady state output of the plastication portion, thereby emptying reservoir 80, as explained in detail below.

As the plastication portion continues, the magnitude of the surge decreases and reservoir area 80 automatically empties as the plastication portion again reaches a quasi-steady state. The reservoir empties because, as noted above, twin flights 70 and 73 are of increased pitch in surge suppressor 53. The surge suppressor thus pumps at an output greater than the quasi-steady state output of the first stage. Advantageously, an empty reservoir area 80 is "ready" to absorb the next surge. Thus, with the present invention, surges do not slow down the machine or reduce the plasticating capacity thereof, or worse yet, clog the vent opening. Instead, the surge suppressor of the present invention harmonizes fluctuations inherently present in an injection molding cycle so that the machine can operate at full capacity without plastic material bleeding into the vent opening and clogging it.

Without wishing to be tied to any specific theory, the novel and advantageous operation of the surge suppressor of the present invention, particularly the emptying of reservoir 80, can perhaps be better understood with reference to "drag flow" and "pressure flow." Drag flow and pressure flow are two separate mechanisms by which melted plastic material is conveyed along a screw. Pressure flow occurs when two characteristics are present. First, fluid pressure at one point along the screw must of course be greater than the fluid pressure at a second point along the screw. Second, there must be no voids between the conveyed material and the interior surface of the barrel wall, otherwise the pressure gradient would tend to result in the voids becoming filled instead of inducing flow along the screw.

Drag flow, on the other hand, results from the viscous nature of the plastic. Melted plastic disposed along the barrel wall tends to stick thereto. However, when the screw rotates, the plastic is forced to move down the channel of the screw, much like a nut moves along the longitudinal axis of a bolt when the bolt is rotated with respect to the nut.

The surge suppressor of the present invention employs "drag flow" to empty reservoir 80. During the surge, the reduced clearance provided by protrusion 82 restricts the flow of material thereacross. Such restriction can be understood as a "pinching" effect. As a result of this restriction, melt material fills reservoir 80. Once the surge dissipates, the reservoir begins to empty and voids occur between the bore 24 and the plasticated material in the area of reservoir area 80. However, as explained above, "pressure flow" does not occur once voids are present. Thus, it can now be understood that it is "drag flow" induced by the screw thread and not "pressure flow" which causes reservoir 80 to empty.

Advantageously, the present invention employs "drag flow" to empty reservoir 80 by providing twin flights 70 and 73 of increased pitch across protrusion 82. Thus, as the screw continues to rotate during the plastication cycle, the helical threads around protrusion 82 convey material thereacross. Moreover, the twin threads 70 and 73 increase the "output" of surge suppressor 53 beyond the steady state output of the first stage. Accordingly, reservoir 80 to empties after each surge.

As the molding cycle continues, the plastication portion again finishes and the injection and holding portions take place. Again, plastic melts in the hot barrel and forms another pool of melt material which will be easily conveyed once the screw resumes rotating, thereby causing another surge. However, it can now be appreciated that when the screw again begins to rotate, surge suppressor 53 of the present invention is ready to absorb the next surge.

While this invention has been described as having an exemplary design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A plasticating apparatus operable to masticate, plasticate, and devolatilize synthetic resinous material while preparing the synthetic resinous material for injection into a mold cavity which shapes the material, said apparatus comprising:

a barrel having a longitudinal screw-receiving bore, a distal end, a feed opening communicating with said bore to admit synthetic resinous feed material, a discharge opening communicating with said bore at said distal end to deliver material to a mold, and a vent opening disposed intermediate said feed opening and said discharge opening to exhaust liberated gases;

a screw having a root and a protruding first helical screw flight positioned in said screw-receiving bore and including a first stage communication with the feed opening and operable within the barrel to receive, masticate ands substantially completely plasticate synthetic resinous material, a second stage communicating with the vent opening and the discharge opening, said second stage including a vent area of increased channel depth communicating with said vent opening;

a surge suppressor disposed intermediate said first and said second stages, said surge suppressor operable to suppress surges of plasticated material occurring during an injection molding cycle, accumulate plasticated material during the surges, and dispense the accumulated plasticated material downstream between surges; and said surge suppressor further including a reservoir area of increased channel depth and an integral protrusion of said root of said screw, said protrusion disposed downstream of and adjacent to said reservoir area, said protrusion comprising a radially outwardly extending annular ring radially spaced from said bore to define a restricted annular space.

2. The apparatus of claim 1, wherein said first helical flight ends upstream of said surge suppressor.

3. The apparatus of claim 2, wherein a second helical flight originates in said surge suppressor, said second helical flight having a greater pitch than said first helical flight, whereby said reservoir empties during cyclical portions of substantially steady state.

4. The apparatus of claim 3, wherein said second helical flight comprises a twin flight.

5. The apparatus of claim 1, wherein said protrusion has a peripheral surface providing working radial clearance with said bore, said working clearance adapted so that plasticated material flows downstream substantially unrestricted past said protrusion when plastication in said apparatus has reached a substantially steady state condition, whereas said working clearance is adapted to restrict surges of plasticated material, said reservoir accumulating the material restricted thereby and dispensing the plasticated material downstream during the substantially steady state condition.

6. The apparatus of claim 5, wherein said peripheral surface of said protrusion is substantially cylindrical.

7. The apparatus of claim 1, wherein said protrusion has an axial width of between 10% and 100% of the pitch of said first helical screw flight.

8. The apparatus of claim 1, wherein the surge suppressor has a length between 2 and 4 times the ratio of screw length to diameter.

9. The apparatus of claim 1, further including an Egan mixer disposed upstream of said surge suppressor.

10. The apparatus of claim 1, wherein said first stage includes a double wave mixing section at a downstream end thereof.

11. A plasticating apparatus operable to masticate, plasticate, and devolatilize synthetic resinous material while preparing the synthetic resinous material for injection into a mold cavity which shapes the material, said apparatus comprising:

a barrel having a longitudinal screw-receiving bore, a distal end, a feed opening communicating with said bore to admit synthetic resinous feed material, a discharge opening communicating with said bore at said distal end to deliver material to a mold, and a vent opening disposed intermediate said feed opening and said discharge opening to exhaust liberated gases;

a screw having a root and a first protruding helical screw flight positioned in said screw-receiving bore and including a first stage communication with the feed opening and operable within the barrel to receive, masticate ands substantially completely plasticate synthetic resinous material, a second stage communicating with the vent opening and the discharge opening, said second stage including a vent area of increased channel depth communicating with said vent opening;

a surge suppressor disposed intermediate said first and said second stages, said surge suppressor operable to suppress surges of plasticated material occurring during an injection molding cycle, accumulate plasticated material during the surges, and dispense the accumulated plasticated material downstream between surges;

said surge suppressor including a reservoir area of increased channel depth and an integral protrusion of said root of said screw, said protrusion disposed downstream of and adjacent to said reservoir area, said protrusion having a second helical screw flight extending therefrom,said protrusion comprising a radially outwardly extending annular ring radially spaced from said bore to define a restricted annular space.

12. The apparatus of claim 11, wherein said first helical flight terminates in said first stage and said second helical flight originates in said surge suppressor and extends to said distal end of said screw.

13. The apparatus of claim 1, further comprising a second helical flight traversing said protrusion.

* * * * *